United States Patent
Adzic et al.

(10) Patent No.: US 7,704,918 B2
(45) Date of Patent: Apr. 27, 2010

(54) SYNTHESIS OF METAL-METAL OXIDE CATALYSTS AND ELECTROCATALYSTS USING A METAL CATION ADSORPTION/REDUCTION AND ADATOM REPLACEMENT BY MORE NOBLE ONES

(75) Inventors: Radoslav Adzic, East Setauket, NY (US); Miomir Vukmirovic, Port Jefferson Station, NY (US); Kotaro Sasaki, Ronkonkoma, NY (US)

(73) Assignee: Brookhaven Science Associates, LLC, Upton, NY (US)

( * ) Notice: Subject to any disclaimer, the term of this patent is extended or adjusted under 35 U.S.C. 154(b) by 174 days.

(21) Appl. No.: 11/760,051

(22) Filed: Jun. 8, 2007

(65) Prior Publication Data

US 2007/0264189 A1    Nov. 15, 2007

Related U.S. Application Data

(63) Continuation-in-part of application No. 11/132,378, filed on May 19, 2005.

(51) Int. Cl.
*B01J 23/40* (2006.01)
(52) U.S. Cl. ............ 502/327; 502/325; 502/326; 502/311; 502/332; 502/339; 423/604; 423/592.1; 423/608; 423/594.18; 423/618; 429/13; 429/40; 420/466; 420/467; 420/468
(58) Field of Classification Search ............ None
See application file for complete search history.

(56) References Cited

U.S. PATENT DOCUMENTS 3,953,368 A * 4/1976 Sinfelt .................... 502/223

| 4,090,978 A | 5/1978 | Welsh et al. |
| 4,232,097 A | 11/1980 | Shanks et al. |
| 5,225,391 A | 7/1993 | Stonehart et al. |
| 5,227,030 A | 7/1993 | Beaver et al. |
| 5,733,675 A | 3/1998 | Dederer et al. |
| 5,939,220 A * | 8/1999 | Gunner et al. .......... 429/40 |
| 6,019,946 A | 2/2000 | Castillo et al. |
| 6,162,530 A | 12/2000 | Xiao et al. |

(Continued)

FOREIGN PATENT DOCUMENTS

JP   05-254843   5/1993

OTHER PUBLICATIONS

Brankovic et al (Journal: Metal monolayer deposition by replacement of metal adlayers on electrode surfaces, Surface Science 2001, pp. L173-L179).*

(Continued)

*Primary Examiner*—Melvin C Mayes
*Assistant Examiner*—Smita Patel
(74) *Attorney, Agent, or Firm*—Dorene M. Price (57) ABSTRACT

The invention relates to platinum-metal oxide composite particles and their use as electrocatalysts in oxygen-reducing cathodes and fuel cells. The invention particularly relates to methods for preventing the oxidation of the platinum electrocatalyst in the cathodes of fuel cells by use of these platinum-metal oxide composite particles. The invention additionally relates to methods for producing electrical energy by supplying such a fuel cell with an oxidant, such as oxygen, and a fuel source, such as hydrogen. The invention also relates to methods of making the metal-metal oxide composites.

23 Claims, 1 Drawing Sheet

U.S. PATENT DOCUMENTS

| | | | |
|---|---|---|---|
| 6,183,894 | B1 | 2/2001 | Adzic et al. |
| 6,294,246 | B1 | 9/2001 | Watanabe et al. |
| 6,346,182 | B1 * | 2/2002 | Bradley .................. 205/89 |
| 6,489,052 | B1 | 12/2002 | Acker |
| 6,517,802 | B1 | 2/2003 | Xiao et al. |
| 6,541,142 | B1 | 4/2003 | Yu et al. |
| 6,559,094 | B1 | 5/2003 | Korotkikh et al. |
| 6,680,279 | B2 | 1/2004 | Cai et al. |
| 6,723,298 | B1 | 4/2004 | Baumann et al. |
| 6,828,056 | B2 | 12/2004 | Molter et al. |
| 2003/0224162 | A1 | 12/2003 | Hirai et al. |
| 2004/0009388 | A1 | 1/2004 | Faguy |
| 2004/0072061 | A1 | 4/2004 | Nakano et al. |
| 2009/0117020 | A1 * | 5/2009 | Manthiram et al. ......... 423/274 |

OTHER PUBLICATIONS

A. Eichler (Journal: Modelling Oxide Metal Interfaces from DFT-Platinum adsorption on tetragonal zirconia, Phys. Rev.B. vol. 68, 205-408 (2003)).*

B. Broyde, "Tungsten Bronze Fuel Cell Catalysts", *Journal of Catalysis*, vol. 10, pp. 13-18 (1968).

M. F. Weber, et al., "Electrocatalytic Activity of Cubic Sodium Tungsten Bronze", *J. Electrochem. Soc.: Electrochemical Science and Technology*, vol. 128, No. 5, pp. 996-1003 (1981).

M.F. Weber, et al., "Surface and Electrocatalytic Properties of Tungsten Bronzes", National Bureau of Standards Special Publication 455, *Electrocatalysis on Non-Metallic Surfaces*, Proceedings of Workshop held at NBS, Gaithersburg, MD., Dec. 9-12, pp. 297-303 (1975).

M. Mamak, et al., "Self-Assembling Solid Oxide Fuel Cell Materials: Mesoporous Yttria-Zirconia and Metal-Yttria-Zirconia Solid Solutions", *J. Am. Chem. Soc.*, vol. 122, pp. 8932-8939 (2000).

A. Eichler, "Modelling Oxide Metal Interfaces from DFT-Platinum adsorption on tetragonal zirconia", *Phys. Rev. B.*, vol. 68, 205-408 (2003).

* cited by examiner

Figure 1

SYNTHESIS OF METAL-METAL OXIDE CATALYSTS AND ELECTROCATALYSTS USING A METAL CATION ADSORPTION/REDUCTION AND ADATOM REPLACEMENT BY MORE NOBLE ONES

CROSS REFERENCE TO RELATED APPLICATION

The present invention is a continuation-in-part of pending U.S. patent application Ser. No. 11/132,378 filed May 19, 2005, which is incorporated herein by reference in its entirety.

STATEMENT OF GOVERNMENT LICENSE RIGHTS

The present invention was made with government support under Grant No. DE-AC02-98CH10886 awarded by the U.S. Department of Energy. The United States government has certain rights in the invention.

The present invention relates to particle composites useful as catalysts, and particularly, oxygen-reducing electrocatalysts in fuel cells. The invention particularly relates to platinum-metal oxide composite electrocatalysts having reduced oxidation and dissolution rates of platinum in the oxygen-reducing cathode of fuel cells. The invention also relates to the metallization of oxide coatings, and growth of layered metal, oxide, or mixed metal-oxide films in electronic circuits technologies.

BACKGROUND OF THE INVENTION

A "fuel cell" is a device which converts chemical energy into electrical energy. In a typical fuel cell, a gaseous fuel such as hydrogen is fed to an anode (the negative electrode), while an oxidant such as oxygen is fed to a cathode (the positive electrode). Oxidation of the fuel at the anode causes a release of electrons from the fuel into an electrically conducting external circuit which connects the anode and cathode. In turn, the oxidant is reduced at the cathode using the electrons provided by the oxidized fuel.

The electrical circuit is completed by the flow of ions through an electrolyte that allows chemical interaction between the electrodes. The electrolyte is typically in the form of a proton-conducting polymer membrane. The proton-conducting membrane separates the anode and cathode compartments while allowing the flow of protons between them. A well-known example of such a proton-conducting membrane is NAFION®.

A fuel cell, although having components and characteristics similar to those of a typical battery, differs in several respects. A battery is an energy storage device whose available energy is determined by the amount of chemical reactant stored within the battery itself. The battery will cease to produce electrical energy when the stored chemical reactants are consumed. In contrast, the fuel cell is an energy conversion device that theoretically has the capability of producing electrical energy for as long as the fuel and oxidant are supplied to the electrodes.

In a hydrogen/oxygen fuel cell, hydrogen is supplied to the anode and oxygen is supplied to the cathode. Hydrogen molecules are oxidized to form protons while releasing electrons into the external circuit. Oxygen molecules are reduced at the cathode to form reduced oxygen species. Protons travel across the proton-conducting membrane to the cathode compartment to react with reduced oxygen species, thereby forming water. The reactions in a typical hydrogen/oxygen fuel cell are as follows:

In many fuel cell systems, a hydrogen fuel is produced by converting a hydrocarbon-based fuel such as methane, or an oxygenated hydrocarbon fuel such as methanol, to hydrogen in a process known as "reforming". The reforming process typically involves the reaction of such fuels with water along with the application of heat. By this reaction, hydrogen is produced. The byproducts of carbon dioxide and carbon monoxide typically accompany the production of hydrogen by reforming processes.

Other fuel cells, known as "direct" or "non-reformed" fuel cells, oxidize fuels high in hydrogen content directly, without the need for hydrogen to be produced by a reforming process. For example, it has been known since the 1950's that lower primary alcohols, particularly methanol, can be oxidized directly. Due to the advantage of bypassing the reformation step, a substantial effort has gone into the development of so-called "direct methanol oxidation" fuel cells.

In order for the oxidation and reduction reactions in a fuel cell to occur at useful rates and at desired potentials, electrocatalysts are required. Electrocatalysts are catalysts that promote the rates of electrochemical reactions, and thus, allow fuel cells to operate at lower potentials. Accordingly, in the absence of an electrocatalyst, a typical electrode reaction would occur, if at all, only at very high potentials. Due to the high catalytic nature of platinum, supported platinum and platinum alloy materials are preferred as electrocatalysts in the anodes and cathodes of fuel cells.

However, a significant obstacle in commercializing fuel cells is the lack of stability of platinum electrocatalysts in the cathode during operation of the fuel cell. Typically, during operation of a fuel cell, the cathode potential will vary between approximately 0.5 and 1 V. The cathode potential variation is caused by the fluctuating power requirements of a machine driven by the fuel cell. For example, an automobile operated by a fuel cell requires stopping and starting.

During the higher cathode potentials, circa one volt, a portion of the platinum electrocatalyst has a tendency to oxidize, thereby causing the concomitant dissolution of platinum ions. The platinum ions are able to migrate at least as far as the proton conducting membrane. Hydrogen crossing through the proton conducting membrane from the anode causes the subsequent reduction of the platinum ions into platinum nanoparticles. Accordingly, platinum is depleted from the cathode while the build up of platinum on the proton conducting membrane impedes the transport of hydrogen to the cathode. Both of the foregoing effects cause a large loss in potential during operation of the fuel cell. This loss in potential is the source of a major decline in the fuel cell's efficiency.

Accordingly, there is a need for new platinum-based electrocatalysts which are resistant to the oxidation and dissolution effects described above. Such platinum electrocatalysts would greatly further the commercialization of fuel cells. The present invention relates to such platinum electrocatalysts and methods of making the same.

SUMMARY OF THE INVENTION

In one embodiment, the invention relates to platinum-metal oxide composite particles. The platinum-metal oxide composite particles contain a metal oxide core at least partially encapsulated by an atomically thin layer of zerovalent or partially charged platinum atoms. Alternatively, or in addition, the metal oxide core is bound to zerovalent or partially charged platinum clusters.

When directed to fuel cells, the platinum-metal oxide composite particles preferably contain a metal oxide core having an oxide composition capable of withstanding degradation under the operating conditions of a fuel cell.

In one embodiment, the metal oxide core includes an oxide of one or more metals selected from the group consisting of titanium, niobium, yttrium, zirconium, molybdenum, chromium, nickel, manganese, vanadium, tantalum, tungsten, rhenium, ruthenium, rhodium, and iridium.

In another embodiment, the metal oxide core includes an oxide of one or more metals selected from the group consisting of titanium, niobium, molybdenum, chromium, nickel, manganese, vanadium, tantalum, tungsten, rhenium, ruthenium, rhodium, and iridium.

In another embodiment, the metal oxide core includes an oxide of one or more metals selected from the group consisting of titanium, niobium, molybdenum, chromium, nickel, manganese, vanadium, tantalum, rhenium, ruthenium, rhodium, and iridium.

In a preferred embodiment, the metal oxide core of the platinum-metal oxide composite particles includes an oxide of tungsten. In a further preferred embodiment, the oxide of tungsten is a sodium tungsten oxide. In an even further preferred embodiment, the sodium tungsten oxide is a sodium-tungsten bronze.

Preferably, the metal oxide core of the platinum-metal oxide composite particles is in the size range of one nanometer to five hundred microns. More preferably, the metal oxide core of the platinum-metal oxide composite particles is in the size range of approximately ten to fifty nanometers.

When the metal oxide core is bound to platinum clusters, each of the platinum clusters preferably independently includes approximately three to sixty platinum atoms.

When the metal oxide core is at least partially encapsulated by an atomically thin layer of zerovalent or partially charged platinum atoms, the atomically thin layer is preferably a submonolayer, monolayer, bilayer, or trilayer, of zerovalent or partially charged platinum atoms.

In another embodiment, the invention relates to an oxygen-reducing cathode. The oxygen-reducing cathode includes an electrically conductive support bound to the platinum-metal oxide composite particles described above. The electrically conductive support is preferably selected from the group consisting of carbon black, graphitized carbon, graphite, and activated carbon.

In another embodiment, the invention relates to a fuel cell. The fuel cell includes (i) the oxygen-reducing cathode described above; (ii) an anode; (iii) an electrically conductive contact connecting the oxygen-reducing cathode with the anode; and (iv) an ion-conducting electrolyte in mutual contact with the oxygen-reducing cathode and anode. The ion-conducting electrolyte is more preferably a proton-conducting electrolyte, and even more preferably a proton-conducting membrane.

In another embodiment, the invention relates to a method for improving fuel cell stability by preventing or reducing platinum dissolution in an oxygen-reducing cathode of a fuel cell. The method includes incorporating platinum-metal oxide composite particles, as described above, into the oxygen-reducing cathode of a fuel cell.

In yet another embodiment, the invention relates to a method for producing electrical energy. The method includes (i) contacting the oxygen-reducing cathode of a fuel cell, as described above, with an oxidant, such as oxygen; and (ii) contacting the anode of the fuel cell with a fuel source, such as hydrogen.

The fuel source can be, for example, hydrogen gas. The hydrogen gas can be supplied directly, or alternatively, generated from the reformation of a fuel, such as from reformed methanol, reformed methane, or reformed gasoline.

Some other fuel sources include, for example, alcohols, methane, gasoline, formic acid, dimethyl ether, and ethylene glycol. Some examples of suitable alcohols include methanol and ethanol.

The invention also relates to a method of making a metal-metal oxide composite by forming a non-noble metal ion adsorbate on a metal oxide core, reducing the ion adsorbate to provide an oxidation-labile surface, and contacting the surface with a solution of noble metal salts. The method of making a metal-metal oxide composite can be repeated to obtain a desired amount of metal coating.

The non-noble metal ion adsorbate can be reduced electrochemically or chemically. The non-noble metal ion adsorbate is $Pb^{2+}$, $Zn^{2+}$, $Cu^{2+}$, $Bi^{3+}$, $Tl^+$, $Cd^{2+}$, $Ag^+$, $Sn^{2+}$, $Hg^+$, $Sb^{3+}$, $Se^{4+}$, $Te^{4+}$, or anionic forms thereof.

The metal oxide core can be made of either stoichiometric or non-stoichiometric metal oxide. In one embodiment, the metal oxide core includes one or more metals selected from the group consisting of titanium, niobium, yttrium, zirconium, molybdenum, chromium, nickel, manganese, vanadium, tantalum, tungsten, rhenium, ruthenium, rhodium, and iridium.

In a preferred embodiment, the metal oxide core of the metal-metal oxide composite includes an oxide of tungsten. In a further preferred embodiment, the oxide of tungsten is a sodium tungsten oxide. In an even further preferred embodiment, the sodium tungsten oxide is a sodium-tungsten bronze.

In another preferred embodiment, the metal oxide core of the metal-metal oxide composition includes an oxide of niobium. In another preferred embodiment, the metal oxide core includes an oxide of titanium. In a further preferred embodiment, the oxide of titanium is either $TiO_2$ or $Ti_4O_7$.

Preferably, the metal oxide core of the metal-metal oxide composite is in the size range of one nanometer to five hundred microns. More preferably, the metal oxide core of the metal-metal oxide composite particles is in the size range of approximately ten to fifty nanometers.

The noble metal salts can include salts of platinum, gold, palladium, silver, ruthenium, rhodium, osmium, iridium, or combinations thereof. Preferably, the noble metal salts are salts of platinum. The noble metal salt may also be a combination of platinum-iridium salt or platinum-gold salts.

When the metal oxide core is at least partially encapsulated by an atomically thin layer of zerovalent or partially charged platinum atoms, the atomically thin layer is preferably a submonolayer, monolayer, bilayer, or trilayer, of zerovalent or partially charged platinum atoms.

The metal oxide core can be bound to zerovalent or partially charged platinum clusters. Each zerovalent or partially charged platinum cluster preferably independently includes approximately three to sixty platinum atoms.

In another embodiment, the metal oxide core is bound to zerovalent or partially charged platinum-noble metal clusters. The platinum-noble metal cluster preferably is platinum-iridium or platinum-gold.

As a result of the present invention, the stability of fuel cells is improved by preventing or reducing platinum oxidation and dissolution in oxygen-reducing cathodes therein. In addition, the invention provides a significant reduction in platinum loading while maintaining the oxygen-reducing electrocatalytic activity of platinum.

DETAILED DESCRIPTION OF THE INVENTION

In one embodiment, the invention relates to platinum-metal oxide composite particles. In a particular embodiment, the platinum-metal oxide composite particles are composed, minimally, of a metal oxide core at least partially encapsulated by an atomically thin layer of zerovalent or partially charged platinum atoms. The "atomically thin surface layer" is a layer of zerovalent or partially charged platinum atoms, preferably of sub-monoatomic, monoatomic, diatomic, or triatomic thickness, or any combination thereof.

The atomically thin layer of platinum typically takes the shape of the metal oxide surface. Since a metal oxide carrier particle typically contains pores or channels on its surface, the atomically thin layer of platinum is typically non-continuous. For example, the platinum layer can be speckled with holes corresponding to such pores or channels. In addition, since the metal oxide surface contains at least two elements (i.e., metal and oxygen atoms), the platinum layer can assume a pattern by bonding preferentially to at least one of the elements.

A layer of monoatomic thickness of platinum atoms, i.e., an atomic monolayer, is a single layer of close-packed platinum atoms on the surface of the metal oxide carrier particle. An atomic monolayer has a surface packing parameter of 1.

A layer of sub-monoatomic coverage, i.e., an atomic sub-monolayer, is a layer of platinum atoms which is less dense than an atomic monolayer (i.e., not close-packed). Accordingly, an atomic submonolayer has a surface packing parameter of less than 1. For example, a surface packing parameter of 0.5 indicates half the density of platinum atoms as compared to a platinum atomic monolayer.

A layer of diatomic thickness refers to a bilayer (two-atom thick) of zerovalent or partially charged platinum atoms. A layer of triatomic thickness refers to a trilayer (three-atom thick) of zerovalent or partially charged platinum atoms.

In one embodiment, an atomic submonolayer of platinum contains only platinum atoms in the absence of other co-deposited metal atoms.

In another embodiment, an atomically thin layer of platinum atoms includes one or more co-deposited other metals to form an atomically thin layer of platinum alloy. In a particular embodiment, an atomic submonolayer of platinum atoms includes one or more co-deposited atomic submonolayers of another metal to form a platinum alloy monolayer. The co-deposited metal(s) can be, for example, a main group, transition, lanthanide, or actinide metal.

The co-deposited metal(s) in a platinum alloy monolayer provide such advantages as, for example, further reduction in platinum loading as compared to a pure platinum monolayer, reduction in catalytic poisoning, and/or enhancement of catalytic activity. For example, some metals, particularly some of the transition metals, have the ability to adsorb hydroxyl groups (OH). Hydroxyl groups are known to inhibit the oxygen-reducing catalytic activity of platinum. Therefore, particularly when applied as fuel cell catalysts, the co-depositing metal is more preferably a metal known to adsorb OH, e.g., iridium (Ir), ruthenium (Ru), osmium (Os), rhenium (Re), and combinations thereof.

The ratio of co-deposited metal to platinum in such a platinum alloy monolayer is not particularly limited. For example, such a platinum alloy monolayer can be a binary alloy according to the formula $M_xPt_{1-x}$(1), wherein M is any of the metals described above.

In formula (1), the value of x is not particularly limited. For example, x can have a minimum value of about 0.01, 0.05, 0.1, 0.2, or 0.3. Alternatively, or in combination, x can have a maximum value of about 0.99, 0.9, 0.8, 0.7, 0.6, or 0.5.

Some more specific platinum binary alloy monolayers of formula (1) are represented by the formulas $Ir_xPt_{1-x}$, $Ru_xPt_{1-x}$, $Os_xPt_{1-x}$, or $Re_xPt_{1-x}$. Some specific examples of platinum binary alloy monolayers include $Ir_{0.01}Pt_{0.99}$, $Ir_{0.1}Pt_{0.9}$, $Ir_{0.2}Pt_{0.8}$, $Ir_{0.3}Pt_{0.7}$, $Ir_{0.5}Pt_{0.5}$, $Ir_{0.7}Pt_{0.3}$, $Ir_{0.8}Pt_{0.2}$, $Ir_{0.9}Pt_{0.1}$, $Ir_{0.95}Pt_{0.05}$, $Ru_{0.01}Pt_{0.99}$, $Ru_{0.1}Pt_{0.9}$, $Ru_{0.2}Pt_{0.8}$, $Ru_{0.3}Pt_{0.7}$, $Ru_{0.5}Pt_{0.5}$, $Ru_{0.7}Pt_{0.3}$, $Ru_{0.8}Pt_{0.2}$, $Ru_{0.9}Pt_{0.1}$, $Ru_{0.95}Pt_{0.05}$, $Os_{0.2}Pt_{0.8}$, $Os_{0.5}Pt_{0.5}$, $Os_{0.7}Pt_{0.3}$, $Os_{0.8}Pt_{0.2}$, $Os_{0.9}Pt_{0.1}$, $Re_{0.2}Pt_{0.8}$, $Re_{0.5}Pt_{0.5}$, $Re_{0.7}Pt_{0.3}$, $Re_{0.8}Pt_{0.2}$, and $Re_{0.9}Pt_{0.1}$.

The platinum alloy monolayer can additionally be a ternary alloy. For example, the platinum alloy monolayer can be a ternary alloy according to the formula $M_xN_yPt_{1-x-y}$(2). In formula (2), M and N are independently any of the suitable metals described above. The values of x and y are not particularly limited. By the rules of chemistry, the sum of x and y in formula (2) must be less than 1. For example, x and y may independently have a value of about 0.01 to a value of about 0.99, as long as the sum of x and y is less than 1.0. More preferably, the sum of x and y has a minimum value of about 0.1 and a maximum value of about 0.9.

Some more specific platinum ternary alloy monolayers of formula (2) are represented by the formulas $Ir_xRu_yPt_{1-x-y}$, $Ir_xOs_yPt_{1-x-y}$, $Ir_xRe_yPt_{1-x-y}$, $Os_xRu_yPt_{1-x-y}$, $Re_xRu_yPt_{1-x-y}$, and $Re_xOs_yPt_{1-x-y}$. Some specific examples of ternary platinum-metal alloy monolayers include $Ir_{0.01}Ru_{0.01}Pt_{0.98}$, $Ir_{0.1}Ru_{0.1}Pt_{0.8}$, $Ir_{0.2}Ru_{0.1}Pt_{0.7}$, $Ir_{0.1}Ru_{0.2}Pt_{0.7}$, $Ir_{0.3}Ru_{0.1}Pt_{0.6}$, $Ir_{0.5}Ru_{0.1}Pt_{0.4}$, $Ir_{0.01}Os_{0.01}Pt_{0.98}$, $Ir_{0.1}Os_{0.1}Pt_{0.8}$, $Ir_{0.2}Os_{0.1}Pt_{0.7}$, $Ir_{0.1}Os_{0.2}Pt_{0.7}$, $Ir_{0.01}Re_{0.01}Pt_{0.98}$, $Ir_{0.1}Re_{0.1}Pt_{0.8}$, $Ir_{0.2}Re_{0.1}Pt_{0.7}$, and $Ir_{0.1}Re_{0.2}Pt_{0.7}$.

The platinum alloy monolayer can additionally be a quaternary alloy. For example, the platinum alloy monolayer can be a quaternary alloy according to the formula $M_xN_yT_zPt_{1-x-y-z}$(3). In formula (3), M, N, and T are independently any of the suitable metals described above. The values of x, y, and z are not particularly limited. By the rules of chemistry, the sum of x, y, and z in formula (3) must be less than 1. For example, x, y, and z may independently have a value of about 0.01 to a value of about 0.99 as long as the sum of x, y, and z is less than 1.0. More preferably, the sum of x, y, and z has a minimum value of about 0.1 and a maximum value of about 0.9.

Some more specific platinum quaternary alloy monolayers of formula (3) are represented by the formulas $Ir_xRu_yRe_zPt_{1-x-y-z}$ or $Ir_xRu_yOs_zPt_{1-x-z}$. Some specific examples of quaternary platinum alloy monolayers include $Ir_{0.01}Ru_{0.01}Re_{0.01}Pt_{0.97}$, $Ir_{0.1}Ru_{0.1}Re_{0.1}Pt_{0.7}$, $Ir_{0.2}Ru_{0.1}Os_{0.1}Pt_{0.6}$, and $Ir_{0.1}Ru_{0.2}Os_{0.1}Pt_{0.6}$.

In one embodiment, the atomically thin layer of platinum atoms covers the entire surface of the metal oxide particle. In another embodiment, the atomically thin layer of platinum atoms covers a portion of the metal oxide particle. For example, the atomically thin layer of platinum surface atoms can be characterized as interconnected islands with some regions of monoatomic, diatomic, or triatomic depth.

In another embodiment, the platinum-metal oxide composite particles are composed, minimally, of a metal oxide core bound to zerovalent or partially charged platinum clusters. The platinum clusters can also be in combination with the atomically thin platinum layer described above.

The platinum clusters can include other elements thereby resulting in platinum alloy clusters. The one or more alloying elements can be any of the alloying elements described above for an atomically thin layer of platinum alloy.

Preferably, each platinum cluster independently includes at least two platinum atoms. For example, each platinum cluster can have a minimum of two, three, four, five, six, seven, eight, nine, ten, eleven, twelve, thirteen, twenty, thirty, or forty platinum atoms.

The platinum clusters are preferably less than approximately one nanometer in any dimension. Accordingly, the platinum clusters preferably contain up to a maximum number of platinum and other atoms corresponding to a cluster size not greater than approximately one nanometer.

The maximum number of platinum and other atoms in the platinum clusters is dependent on the morphology and packing arrangements of the cluster. Depending on morphology and packing arrangements, the platinum core can have a maximum number of platinum atoms of, for example, forty-five, fifty, fifty-five, or sixty. Some examples of suitable platinum clusters include clusters containing nuclear cores of $Pt_3$, $Pt_4$, $Pt_5$, $Pt_6$, $Pt_9$, $Pt_{12}$, $Pt_{13}$, $Pt_{18}$, $Pt_{20}$, $Pt_{24}$, $Pt_{26}$, $Pt_{30}$, $Pt_{35}$, $Pt_{40}$, $Pt_{45}$, $Pt_{50}$, $Pt_{55}$, and $Pt_{60}$.

For example, a pure platinum cluster having a spherical shape with a close-packed arrangement preferably contains no more than approximately sixty platinum atoms. More preferably, the platinum clusters preferably contain approximately three to sixty platinum atoms.

The atomically thin layer of platinum, or the platinum clusters, as described above, are preferably bound to the metal oxide core. The term "bound" indicates a bond or interaction strong enough to keep the platinum attached to the metal oxide core during use. The bond or interaction between platinum and the metal oxide can be covalent or non-covalent.

The metal oxide core is composed of an oxide of one or more metals. When used in a fuel cell, the composition of the metal oxide core is any metal oxide composition which is capable of withstanding degradation under the operating conditions of a fuel cell. For example, it is particularly preferred that the oxide composition can withstand an operating temperature of at least approximately 80° C., more preferably 100° C., and even more preferably 120° C., which is the maximum operating temperature for most polymer electrolyte fuel cells (PEFCs). Even more preferred are oxide compositions which can withstand operating temperatures of at least 200° C., and even more preferably at least 250° C., which is the maximum operating temperature for most alkaline and phosphoric acid fuel cells.

The oxide composition is also preferably capable of withstanding any one or more of the various electrolytes used in fuel cells. For example, the oxide composition is preferably capable of withstanding any one or more of the neutral, mildly acidic, strongly acidic, mildly alkaline, or strongly alkaline electrolytes used in fuel cells. In addition, when used in a fuel cell having an aqueous-based electrolyte, the oxide composition is preferably not water soluble.

The metal oxide core can be non-conductive, semiconductive, or conductive. Non-conductive metal oxide particles can be made at least semiconductive by, for example, doping with a suitable amount of a conductive species. Conductive metal oxide particles can have the advantage of being used in a fuel cell electrode directly, i.e., without requiring an electrically conductive support for imparting conductivity.

Preferably, the oxide core is composed of an oxide of one or more metals selected from titanium, niobium, yttrium, zirconium, molybdenum, chromium, nickel, manganese, vanadium, tantalum, tungsten, rhenium, ruthenium, rhodium, and iridium. More preferably, the oxide core is composed of an oxide of one or more metals selected from titanium, niobium, molybdenum, chromium, nickel, manganese, vanadium, tantalum, tungsten, rhenium, ruthenium, rhodium, and iridium. In another embodiment, the oxide core is composed of an oxide of one or more metals selected from titanium, niobium, molybdenum, chromium, nickel, manganese, vanadium, tantalum, rhenium, ruthenium, rhodium, and iridium.

The metal oxide compositions of titanium, niobium, yttrium, zirconium, molybdenum, chromium, nickel, vanadium, tantalum, tungsten, rhenium, ruthenium, rhodium, and iridium are particularly suitable for use in mildly acidic to strongly acidic environments. The manganese oxide compositions are generally more suitable for use in mildly alkaline to strongly alkaline environments.

The metal oxide core can also include an oxide of one or more rare-earth metals. For example, the metal oxide core can include an oxide of one or a combination of lanthanum, cerium, praseodymium, neodymium, samarium, europium, gadolinium, or terbium.

Any of the metal oxide compositions described above can further include one or more metals selected from the alkali, alkaline earth, main group, transition, lanthanide, and actinide classes of metals. For example, the metal oxide compositions can further include the various silica and alumina compositions. Some examples of suitable silica and alumina compositions include $SiO_2$, $Al_2O_3$, $SiO_2$—$Al_2O_3$, $SiO_2$—$B_2O_3$, $SiO_2$—$P_2O_5$, $SiO_2$—$SnO_2$, $Al_2O_3$—$B_2O_3$, $Al_2O_3$—$P_2O_5$, $Al_2O_3$—$SnO_2$, $SiO_2$—$Al_2O_3$—$B_2O_3$, $SiO_2$—$Al_2O_3$—$P_2O_5$, and $SiO_2$—$Al_2O_3$—$SnO_2$. The metal oxide compositions also include any of the hydrated forms.

Some examples of titanium oxide compositions suitable as the metal oxide core include titanium (IV) oxide ($TiO_2$), titanium (III) oxide ($Ti_2O_3$), titanium (II) oxide (TiO), lithium titanium oxide ($Li_2TiO_3$), barium titanium oxide ($BaTiO_3$), barium strontium titanium oxide (e.g., $Ba_xSr_{1-x}TiO_3$), aluminum titanium oxide ($Al_2TiO_5$), calcium titanium oxide (e.g., $CaTiO_3$ and $Ca_3Ti_2O_7$), magnesium titanium oxide ($MgTi_2O_5$), potassium titanium oxide ($K_2TiO_3$), strontium titanium oxide ($SrTiO_3$), zirconium titanium oxide ($ZrTiO_4$), zinc titanium oxide ($Zn_2TiO_4$), cobalt titanium oxide ($CoTiO_3$), manganese (II) titanium oxide ($MnTiO_3$), iron (III) titanium oxide ($Fe_2TiO_5$), lanthanum titanium oxide (e.g., $La_2O_3.2TiO_2$), lanthanum barium titanium oxide (e.g., $La_{1-x}Ba_xTiO_3$), gadolinium titanium oxide (e.g., $Gd_2Ti_2O_7$), and dysprosium (II) titanium oxide (e.g., $Dy(TiO_3)_3$).

Some examples of niobium oxide compositions suitable as the metal oxide core include niobium (IV) oxide ($NbO_2$), niobium (V) oxide ($Nb_2O_5$), niobium (II) oxide (NbO), barium niobium oxide ($BaNb_2O_6$), cadmium niobium oxide (e.g., $CdNb_2O_6$ and $Cd_2Nb_2O_7$), barium sodium niobium oxide ($Ba_2NaNb_5O_{15}$), barium strontium niobium oxide (e.g., $Ba_xSr_{1-x}Nb_2O_6$), lithium niobium oxide ($LiNbO_3$), magnesium niobium oxide ($MgNb_2O_6$), sodium niobium oxide ($NaNbO_3$), potassium niobium oxide ($KNbO_3$), strontium niobium oxide (e.g., $SrNb_2O_6$), iron niobium oxide ($FeNbO_4$), and bismuth iron niobium oxide ($Bi_6Fe_4Nb_6O_{30}$).

Some examples of yttrium oxide compositions suitable as the metal oxide core include yttrium (III) oxide ($Y_2O_3$), yttria-stabilized zirconium oxide ($ZrO_2+Y_2O_3$), iron yttrium oxide ($Y_3Fe_5O_{12}$), yttrium aluminum oxide ($Y_3Al_5O_{12}$), and the yttrium barium copper oxides (i.e., $YBa_2Cu_3O_x$, $YBa_2Cu_4O_x$, $Y_2BaCuO_x$, wherein x is typically 6.5-6.8).

Some examples of zirconium oxide compositions suitable as the metal oxide core include zirconium (IV) oxide ($ZrO_2$), calcia-stabilized zirconium oxide ($ZrO_2$, 4% $CaO$), barium zirconium oxide ($BaZrO_3$), calcium zirconium oxide ($CaZrO_3$), cerium zirconium oxide ($CeO_2+ZrO_2$), lead zirconium oxide ($PbZrO_3$), lithium zirconium oxide ($Li_2ZrO_3$), magnesium aluminum zirconium oxide ($MgO—Al_2O_3.ZrO_2$), manganese zirconium oxide, sodium zirconium oxide ($Na_2ZrO_3$), strontium zirconium oxide ($SrZrO_3$), tungsten zirconium oxide ($ZrW_2O_8$), zirconium dichloride oxide hydrates (e.g., $ZrOCl_2.8H_2O$), and zirconium titanium oxide ($ZrTiO_4$).

Some examples of chromium oxide compositions suitable as the metal oxide core include chromium (III) oxide ($Cr_2O_3$), chromium (IV) oxide ($CrO_2$), and chromium (VI) oxide ($CrO_3$).

A suitable subclass of the chromium oxide compositions is the class of chromate compositions, in which chromium is hexavalent. The chromate compositions can be represented by the formula $X^{+z}{}_n(CrO_4)_p$, wherein X is any positively charged species and $nz=2p$. For example, X can be an alkali, alkaline earth, main group, transition or rare earth metal. Some examples of suitable chromates include barium chromate ($BaCrO_4$), lead chromate ($PbCrO_4$), calcium chromate ($CaCrO_4$), potassium chromate ($K_2CrO_4$), strontium chromate ($SrCrO_4$), zinc chromate ($ZnCrO_4$), chromium chromate ($Cr_2(CrO_4)_3$), cobalt (II) chromate ($CoCrO_4$), and nickel (II) chromate ($NiCrO_4$).

Another suitable subclass of the chromium oxide compositions is the class of chromite compositions, wherein chromium is trivalent. Some examples of chromite compositions include sodium chromite ($NaCrO_2$), ferrochromite ($FeCr_2O_4$), copper (II) chromite ($CuCr_2O_4$), nickel (II) chromite ($NiCr_2O_4$), cobalt (II) chromite ($CoCr_2O_4$), zinc (II) chromite ($ZnCr_2O_4$), lanthanum chromite ($LaCrO_3$), and calcium lanthanum chromite ($Ca_xLa_{1-x}CrO_3$). Other suitable chromium oxides include the dichromates and $CrO_2Cl_2$.

Some examples of nickel oxide compositions suitable as the metal oxide core include nickel (II) oxide (NiO), nickel (II) hydroxide ($Ni(OH)_2$), nickel tin oxide ($NiSnO_3$), and nickel vanadium oxides ($NiV_xO$, wherein $0<x<1$).

Some examples of manganese oxide compositions suitable as the metal oxide core include manganese (II) oxide (MnO), manganese (III) oxide ($Mn_2O_3$), manganese (IV) oxide ($MnO_2$), lithium manganese (III, IV) oxide ($LiMn_2O_4$), manganese (II) titanium oxide ($MnTiO_3$), and manganese zirconium oxide ($MnO.ZrO_2$).

Some examples of vanadium oxide compositions suitable as the metal oxide core include vanadium (II) oxide (VO or $VO_x$, wherein x is typically between 0.9 and 1.3), vanadium (III) oxide ($V_2O_3$), vanadium (IV) oxide ($VO_2$), vanadium (V) oxide ($V_2O_5$), vanadium (IV, V) oxide ($V_6O_{13}$), vanadium oxysulfate ($VOSO_4$), vanadium oxytrichloride ($VOCl_3$), magnesium vanadium oxide ($MgV_2O_6$), and cadmium vanadium oxide ($CdV_2O_6$).

Some suitable subclasses of the vanadium oxide compositions are the metavanadates and orthovanadates. The metavanadates can be represented by the formula $X^{+2}{}_n(VO_3)_p$, wherein X is any positively charged species and $nz=p$. For example, X can be an alkali, alkaline earth, main group, transition or rare earth metal. Some examples of suitable metavanadates include sodium metavanadate ($NaVO_3$), potassium metavanadate ($KVO_3$), ammonium metavanadate ($NH_4VO_3$), magnesium metavanadate ($Mg(VO_3)_2$), calcium metavanadate ($Ca(VO_3)_2$), strontium metavanadate ($Sr(VO_3)_2$), barium metavanadate ($Ba(VO_3)_2$), copper (II) metavanadate ($Cu(VO_3)_2$), nickel (II) metavanadate ($Ni(VO_3)_2$), cobalt (II) metavanadate ($Co(VO_3)_2$), zinc metavanadate ($Zn(VO_3)_2$), lead metavanadate ($Pb(VO_3)_2$), cerium (III) metavanadate ($Ce(VO_3)_3$), and terbium (III) metavanadate ($Tb(VO_3)_3$).

The orthovanadates can be represented by the formula $X^{+z}{}_n(VO_4)_p$, wherein X is any positively charged species and $nz=3p$. For example, X can be an alkali, alkaline earth, main group, transition or rare earth metal. Some examples of suitable orthovanadates include sodium orthovanadate ($Na_3VO_4$), potassium orthovanadate ($K_3VO_4$), cesium orthovanadate ($Cs_3VO_4$), magnesium orthovanadate ($Mg_3(VO_4)_2$), calcium orthovanadate ($Ca_3(VO_4)_2$), strontium orthovanadate ($Sr_3(VO_4)_2$), barium orthovanadate ($Ba_3(VO_4)_2$), copper (II) orthovanadate ($Cu_3(VO_4)_2$), nickel (II) orthovanadate ($Ni_3(VO_4)_2$), cobalt (II) orthovanadate ($Co_3(VO_4)_2$), zinc orthovanadate ($Zn_3(VO_4)_2$), lead orthovanadate ($Pb_3(VO_4)_2$), cerium (III) orthovanadate ($CeVO_4$), terbium (III) orthovanadate ($TbVO_4$), and yttrium orthovanadate ($YVO_4$).

Some examples of tantalum oxide compositions suitable as the metal oxide core include tantalum (V) oxide ($Ta_2O_5$), lithium tantalum oxide ($LiTaO_3$), sodium tantalum oxide ($NaTaO_3$), potassium tantalum oxide ($KTaO_3$), magnesium tantalum oxide ($MgTa_2O_6$), calcium tantalum oxide ($CaTa_2O_7$), barium tantalum oxide ($BaTa_2O_6$), barium yttrium tantalum oxide ($Ba(Y_{0.5}Ta_{0.5})O_3$), lead tantalum oxide ($PbTa_2O_6$), barium iron tantalum oxide ($Ba(Fe_{1/3}Ta_{2/3})O_3$), barium magnesium tantalum oxide ($Ba(Mg_{1/3}Ta_{2/3})O_3$), cadmium tantalum oxide ($CdTa_2O_7$), potassium tantalum niobium oxide ($KTa_{0.65}Nb_{0.35}O_3$), and yttrium tantalum oxide ($YTaO_4$).

Some examples of rhenium oxide compositions suitable as the metal oxide core include rhenium (IV) oxide ($ReO_2$), rhenium (VI) oxide ($ReO_3$), rhenium (VII) oxide ($Re_2O_7$), ammonium perrhenate ($NH_4ReO_4$), and sodium perrhenate ($NaReO_4$).

Some examples of ruthenium oxide compositions suitable as the metal oxide core include ruthenium (IV) oxide ($RuO_2$), ruthenium (III) oxide ($Ru_2O_3$), sodium ruthenate ($Na_2RuO_4$), potassium ruthenate ($K_2RuO_4$), bismuth ruthenate ($Bi_2Ru_2O_7$), sodium perruthenate ($NaRuO_4$), and potassium perruthenate ($KRuO_4$).

Some examples of rhodium and iridium oxide compositions suitable as the metal oxide core include rhodium (III) oxide ($Rh_2O_3$), rhodium (IV) oxide ($RhO_2$), iridium (IV) oxide ($IrO_2$), iridium (III) oxide ($Ir_2O_3$), the strontium iridium oxides (e.g., $Sr_4IrO_6$, and $Sr_3MIrO_6$ where M=Zn, Cu, Ni), and the calcium iridium oxides (e.g., $Ca_4IrO_6$, $Ca_3CuIrO_6$, and $Ca_{4-x}Cu_xIrO_6$ wherein x is typically 0.1 to 0.5).

Particularly preferred for the metal oxide core are the molybdenum oxide and tungsten oxide compositions. Some examples of simple molybdenum oxides include molybdenum trioxide ($MoO_3$) and molybdenum dioxide ($MoO_2$). Some examples of simple tungsten oxides include tungsten trioxide ($WO_3$) and tungsten dioxide ($WO_2$). Also included in the molybdenum and tungsten oxide compositions are the non-stoichiometric molybdenum and tungsten oxides.

A suitable subclass of the molybdenum and tungsten oxides includes the molybdates and tungstates. The molybdates and tungstates can be represented by the formulas $X^{+z}{}_n$ (MoO$_4$)$_p$ and X$^{+z}_n$(WO$_4$)$_p$, respectively, wherein X is any positively charged species and nz=2 p. For example, X can be an alkali, alkaline earth, main group, transition or rare earth metal.

Some examples of suitable molybdates include aluminum molybdate (Al$_2$(MoO$_4$)$_3$), barium molybdate (BaMoO$_4$), cadmium molybdate (CdMoO$_4$), cerium molybdate (Ce$_2$(MoO$_4$)$_3$), cesium molybdate (CsMdO$_4$), cobalt molybdate (CoMoO$_4$), nickel molybdate (NiMoO$_4$), copper molybdate (CuMoO$_4$), silver molybdate (Ag$_2$MoO$_4$), lithium molybdate (Li$_2$MoO$_4$), sodium molybdate (Na$_2$MoO$_4$), potassium molybdate (K$_2$MoO$_4$), rubidium molybdate (Rb$_2$MoO$_4$), magnesium molybdate (MgMoO$_4$), calcium molybdate (CaMoO$_4$), strontium molybdate (SrMoO$_4$), and zinc molybdate (ZnMoO$_4$).

Some examples of suitable tungstates include aluminum tungstate (Al$_2$(WO$_4$)$_3$), manganese tungstate (MnWO$_4$), barium tungstate (BaWO$_4$), cadmium tungstate (CdWO$_4$), cerium tungstate (Ce$_2$(WO$_4$)$_3$), cesium tungstate (CsWO$_4$), cobalt tungstate (CoWO$_4$), nickel tungstate (NiWO$_4$), copper tungstate (CuWO$_4$), silver tungstate (Ag$_2$WO$_4$), lithium tungstate (Li$_2$WO$_4$), sodium tungstate (Na$_2$WO$_4$), potassium tungstate (K$_2$WO$_4$), rubidium tungstate (Rb$_2$WO$_4$), magnesium tungstate (MgWO$_4$), calcium tungstate (CaWO$_4$), strontium tungstate (SrWO$_4$), and zinc tungstate (ZnWO$_4$).

A particularly preferred subclass of the tungsten oxides includes the tungsten bronzes. The tungsten bronzes can be represented by the general formula X$_n$WO$_3$ wherein X is any positively charged species and $0<n\leq 1$. For example, X can be an alkali, alkaline earth, main group, transition or rare earth metal.

The tungsten bronzes tend to be inert and are generally at least partially conductive. The tungsten bronzes with n<0.3 are generally semiconductive. Particularly preferred are the tungsten bronzes with n>0.3, since these compositions are extremely inert and have good conductive properties.

Of particular suitability for the metal oxide core is the class of sodium tungsten oxides. The sodium tungsten oxides include, minimally, sodium, tungsten, and oxygen, in any stoichiometric ratio.

A more preferred class of the sodium tungsten oxides is the class of sodium tungsten bronzes. The sodium tungsten bronzes can be represented by the formula Na$_n$WO$_3$ wherein n typically is within the range of approximately 0.3 to 0.95. Some examples of sodium tungsten bronze compositions include Na$_{0.25}$WO$_3$, Na$_{0.3}$WO$_3$, Na$_{0.4}$WO$_3$, Na$_{0.5}$WO$_3$, Na$_{0.6}$WO$_3$, Na$_{0.7}$WO$_3$, Na$_{0.8}$WO$_3$, Na$_{0.9}$WO$_3$, and Na$_{0.95}$WO$_3$.

Additional examples of molybdenum and tungsten oxide compositions include polyoxometalates, in particular those based on compositions of the formulas: MO$_6$, MO$_2$Cl$_2$, M$_2$O$_7^{2-}$, M$_4$O$_{11}$, [(Me$_2$As)M$_4$O$_{14}$OH]$^{2-}$, M$_5$O$_{14}$, MePM$_5$O$_{21}^{4-}$, P$_2$M$_5$O$_{23}^{6-}$, M$_6$O$_{19}^{2-}$, M$_6$O$_{20}$(OH)$_2^{6-}$, M$_7$O$_{24}^{6-}$, As$_2$M$_6$O$_{26}^{6-}$, M$_7$O$_{24}^{6-}$, HM$_7$O$_{24}^{5-}$, M$_8$O$_{23}$, M$_8$O$_{26}^{4-}$, PM$_{11}$O$_{39}^{7-}$, [X$^{+n}$M$_{12}$O$_{40}$]$^{(8-n)-}$ (i.e., the Keggin structure), PM$_{12}$O$_{40}^{3-}$, P$_2$M$_{17}$O$_{61}^{7-}$, SiM$_{11}$O$_{39}^{8-}$, Co$_2$M$_{11}$O$_{40}$H$_2^{8-}$, H$_2$M$_{12}$O$_{42}^{10-}$, CoM$_{12}$O$_{40}^{6-}$, FeM$_{12}$O$_{40}^{5-}$, M$_{18}$O$_{49}$, [(X$^{+n}$)$_2$M$_{18}$O$_{62}$]$^{(16-2n)-}$ (i.e., the Dawson structure), M$_{20}$O☐, [X$^{+n}$M$_6$O$_{24}$]$^{(12-n)-}$, [X$^{+n}$M$_6$O$_{24}$H$_6$]$^{(6-n)-}$, [X$^{+n}$M$_9$O$_{32}$]$^{(10-n)-}$, [X$^{+n}$M$_{12}$O$_{42}$]$^{(12-n)-}$, NaP$_5$M$_{30}$O$_{110}^{14-}$, M$_{36}$O$_{112}^{8-}$, and H$_7$P$_8$M$_{48}$O$_{184}^{33-}$, wherein M represents Mo or W, Me represents methyl (CH$_3$), and X$^{+n}$ represents an appropriate metal ion or other positively charged species with charge n.

Preferably, the metal oxide core has a high surface area. A high surface area allows for better dispersion of the platinum catalyst, and hence, greater efficiency of the oxygen reduction process. Since surface area increases with decreases in particle size, smaller metal oxide cores are preferred. Particularly preferred are metal oxide cores of nanoscale dimensions.

Accordingly, the maximum size of the metal oxide core is preferably approximately five hundred microns, more preferably one hundred microns, more preferably fifty microns, more preferably ten microns, more preferably one micron, more preferably five hundred nanometers, more preferably one hundred nanometers, and even more preferably fifty nanometers.

There is no particular minimum size of the metal oxide core. For example, the metal oxide core can have a minimum size of approximately one nanometer, five nanometers, ten nanometers, twenty nanometers, thirty nanometers, or forty nanometers.

The metal oxide core can also be a large molecular or supramolecular metal oxide cluster. Such oxide clusters include, for example, tetranuclear, pentanuclear, hexanuclear, heptanuclear, octanuclear, nonanuclear, decanuclear, undecanuclear, and dodecanuclear metal oxide species.

The platinum-metal oxide composite particles described above can be in any suitable form. For example, the platinum-metal oxide composite particles can be in a solid form, such as a powder.

Alternatively, the platinum-metal oxide composite particles can be suspended or dispersed in a liquid phase. The liquid phase can be any suitable liquid phase. For example, the liquid phase can be aqueous-based. The aqueous-based liquid phase can be completely water, or can include another suitable solvent. For example, the aqueous-based liquid phase can be a water-alcohol mixture.

Alternatively, the liquid phase can be, or include, an organic solvent. Some examples of suitable organic solvents include acetonitrile, dimethylsulfoxide, dimethylformamide, toluene, methylene chloride, chloroform, hexanes, glyme, diethyl ether, and the like.

The platinum-metal oxide composite particles can be approximately, or precisely, monodisperse in size. Alternatively, the particles can be anywhere from slightly to widely polydisperse in size.

The platinum-metal oxide composite particles can also be of any shape. For example, the particles can be approximately spherical, oblong, rectangular, square planar, pyramidal, trigonal bipyramidal, cuboidal, cylindrical, octahedral, cubooctahedral, icosahedral, rod-shaped, or amorphous. The particles can also be separate and distinct, or alternatively, agglomerated. In addition, the particles can assume, in certain circumstances, a low, moderate, or high degree of organization with respect to each other.

The platinum-metal oxide composite particles can also have on their surface some trace chemicals. Some examples of trace chemicals include halogens, carbon monoxide, charged species, and so on, as long as such trace chemicals do not obviate the intended use of the composite particles.

Preferably, when the platinum-metal oxide composite particles are applied in fuel cells, the surfaces of the particles are free of any surface agents including ligands, polymers, surfactants, and so on. However, for other applications, e.g., in catalysis or nanostructural engineering, a surface active agent can be useful. Such surface active agents can be, for example, suitable metal-bonding ligands or surfactants bound to, or associated with, the surface of the composite particles. Some examples of metal-bonding ligands include phosphines, amines, and thiols.

Some examples of phosphine ligands include trimethylphosphine, triethylphosphine, triisopropylphosphine, triphenylphosphine, the diphosphines, and derivatives therefrom. Some examples of amine ligands include pyridine, 2,2'-bipyridine, terpyridine (2,2'; 6'2"-terpyridine), piperidine, pyrrole, pyrazole, pyrrolidine, pyrimidine, imidazole, trimethylamine, triethylamine, triisopropylamine, ethylenediamine, and ethylenediaminetetraacetic acid (EDTA). Some examples of thiol ligands include thiophenol, methanethiol, ethanethiol, 2-propanethiol, 2-methyl-2-propanethiol, octylthiol, decylthiol, dodecylthiol, methylsulfide, ethylsulfide, phenyldisulfide, thiophene, 2,2'-bithiophene, and tetrathiafulvalene.

Some examples of surfactants include the polyalkyleneoxides, polyvinylalcohols, polyvinylpyrrolidinones, siloxanes, albumin, sodium dodecyl sulfate, fatty acid salts, and the like. Some more specific examples of classes of polyalkyleneoxide surfactants include polymethyleneoxide, poly(methyleneoxide-ethyleneoxide), polyethyleneoxide, polypropylenenoxide, and poly(ethyleneoxide-propyleneoxide) surfactants.

In another embodiment, the invention relates to a catalyst. The catalyst includes the platinum-metal oxide composite particles as thus far described. In one embodiment, the platinum-metal oxide composite particles in the catalyst are bound to a support. The support can be any suitable support. For example, the support can be carbon, alumina, silica, silica-alumina, titania, zirconia, calcium carbonate, barium sulphate, a zeolite, interstitial clay, and the like. In another embodiment, the platinum-coated particles in the catalyst are not bound to a support.

One class of catalysis reactions for which the platinum-metal oxide composite particles are applicable includes hydrogenation and dehydrogenation reactions of hydrocarbons. Another class of applicable catalysis reactions includes carbon-carbon cross-coupling reactions. Yet another class of applicable catalysis reactions includes hydrosilylation reactions.

In another embodiment, the invention relates to an electrocatalyst. The electrocatalyst includes the platinum-metal oxide composite particles described above bound to an electrically conductive support. In a preferred embodiment, the electrocatalyst is an oxygen-reducing electrocatalyst in an oxygen-reducing cathode.

Preferably, the electrically conductive support is carbon-based. Some examples of carbon-based electrically conductive supports include carbon black, graphitized carbon, graphite, and activated carbon.

The electrically conductive support material is preferably finely divided. Accordingly, especially as regards carbon support material for use in fuel cells, such macroscopic species as carbon fibers, rods, tubes, nanotubes, fullerenes, and the like, are not preferred. In a particular embodiment of the invention, such macroscopic species are excluded.

In another embodiment, the invention relates to a fuel cell. The fuel cell includes the oxygen-reducing cathode described above in electrical contact with a fuel-oxidizing anode. An ion-conducting electrolyte is in mutual contact with the oxygen-reducing cathode and anode.

The structure of a typical electrode in a fuel cell includes 1) a fluid permeable side with hydrophobic characteristics and 2) a catalytic side provided with a particulate electrocatalyst. The catalytic side is in direct contact with a liquid or solid electrolyte (e.g., the proton-conducting medium).

The hydrophobic characteristics on the electrode can be provided by one or more substances which are suitably hydrophobic, adhere to the electrode, and do not interfere with the electrochemical process. The hydrophobic substance can also be used as a binder for the supported or unsupported electrocatalyst.

A preferred class of suitable hydrophobic substances is the class of fluorinated polymers. Some examples of particularly preferred fluorinated polymers include polytetrafluoroethylene (PTFE), polytrifluorochloroethylene, and copolymers composed of tetrafluoroethylene and one or more other fluorinated or non-fluorinated monomers. The hydrophobic substance is typically included in an amount of 20 to about 40 percent by weight of the amount of electrocatalyst and/or support.

The electrodes can be any of various shapes, including tubular, rod-like, or planar. In order to maximize the area-to-volume ratio of the electrode, the electrodes are preferably in the form of thin sheets.

The ion-conducting electrolyte conducts either protons or reduced oxygen species from one electrode to the other while separating the fuel at the anode from the oxidant at the cathode. Preferably, the ion-conducting electrolyte is proton-conducting, i.e., selectively conducts protons from the anode to the cathode.

Preferably, the ion-conducting or proton-conducting electrolyte is in the form of a membrane. The proton-conducting membrane can be in any of several suitable forms, for example, a liquid, solid, or semi-solid.

A preferred class of proton-conducting polymer electrolytes are the commercially available copolymers of tetrafluoroethylene and perfluorinated vinyl ethers marketed by E. I. duPont de Nemours and Co under the trade name NAFION®. Such membrane-like materials are derivatized with acidic groups, such as sulfonic, carboxylic, phosphinic, or boric acid groups.

The anode of the fuel cell can be any of the anodes known in the art. For example, the anode can include supported or unsupported platinum or platinum-alloy compositions. The anode can also include a carbon monoxide-tolerant electrocatalyst. Such carbon monoxide tolerant anodes include numerous platinum alloys. A notable carbon monoxide-tolerant anode containing an atomically thin layer of platinum on ruthenium nanoparticles has been disclosed by Adzic et al. in U.S. Pat. No. 6,670,301 B2. The foregoing patent to Adzic et al. is included herein by reference in its entirety.

The fully assembled fuel cell can have stack designs to increase the electrical output. For example, any of the known stack configurations designed for compactness and efficient supply of fuels to the anode and oxygen to the cathode can be used.

In another embodiment, the invention relates to a method for producing electrical energy from the fuel cell described above. The fuel cell, as described, becomes operational and produces electrical energy when the oxygen-reducing cathode is contacted with an oxidant, such as oxygen, and the fuel-oxidizing anode is contacted with a fuel source.

Oxygen gas can be supplied to the oxygen-reducing cathode in the form of pure oxygen gas. Pure oxygen gas is more preferable in the case of alkaline fuel cells. In the case of acid electrolyte fuel cells, the oxygen gas is more preferably supplied as air. Alternatively, oxygen gas can be supplied as a mixture of oxygen and one or more other inert gases. For example, oxygen can be supplied as oxygen-argon or oxygen-nitrogen mixtures.

Some contemplated fuel sources include, for example, hydrogen gas, alcohols, methane, gasoline, formic acid, dimethyl ether, and ethylene glycol. Some examples of suitable alcohols include methanol and ethanol. For alkaline fuel cells, the hydrogen gas is preferably pure, and accordingly, free of contaminants such as carbon dioxide which degrade the strongly alkaline electrolyte.

The fuels can be unreformed or reformed. Unreformed fuels are oxidized directly by the anode. Fuels can also be treated by a reformation process to produce hydrogen. By reforming, hydrogen is supplied to the anode indirectly. For example, hydrogen gas can be generated and supplied to the anode by reforming methanol, methane, or gasoline.

In yet another embodiment, the invention relates to a method for improving fuel cell stability by preventing or reducing platinum dissolution in an oxygen-reducing cathode of a fuel cell. The method requires incorporation of the electrocatalyst described above into the oxygen-reducing cathode of a fuel cell. The electrocatalyst can be incorporated by, for example, coating an electrode with the electrocatalyst in a suitable binder, as described above, and incorporating the coated electrode as an oxygen-reducing cathode in the fuel cell described above.

In a preferred embodiment, the electrocatalyst is incorporated into the oxygen-reducing cathode by mixing the electrocatalyst with an appropriate amount of Vulcan™ carbon and a fluorinated polymer, such as polytetrafluoroethylene. Any two of the foregoing ingredients can be pre-mixed before mixing with the third ingredient. The resulting mixture is preferably pressed onto a nickel net having a gold overlayer.

Without being bound by any theory, it is believed that the electrocatalyst of the invention increases stability primarily by preventing oxidation of the platinum catalyst. The platinum catalyst is believed to be prevented from oxidation through an electronic effect of the metal oxide core on the platinum. Specifically, the metal oxide is believed to exert a shift in the oxidation potential of the platinum catalyst, thereby making oxidation of platinum more difficult.

The oxide material of the oxide core is also believed to be capable of regenerating the platinum catalyst by causing a post-reduction of oxidized platinum. Specifically, the oxide material is believed to adsorb oxidized platinum ions onto its surface oxide and hydroxyl groups. The adsorbed platinum ions, when exposed to decreasing potentials during operation of the fuel cell, are reduced to zerovalent or partially charged platinum, thereby regenerating the platinum catalyst.

The platinum-metal oxide composite particles can be produced by any suitable method. For example, the platinum-metal oxide composite particles can be produced by depositing an atomically thin layer of platinum or platinum clusters onto the surface of metal oxide substrate particles. Some methods for depositing platinum onto the surface of metal oxide substrate particles include reductive chemical methods in a liquid phase, electrodeposition, chemical vapor deposition (CVD), and physical vapor deposition (PVD).

A preferred chemical method for depositing platinum onto the surface of oxide carrier particles includes adsorbing platinum ions onto the surface of the oxide particles followed by chemical reduction of the platinum ions. Chemical reduction of the platinum ions can be complete, thereby converting all of the platinum ions to zerovalent platinum. Alternatively, chemical reduction of the platinum ions can be partial, thereby converting a portion of the platinum ions to zerovalent platinum, and having a portion of platinum remaining as charged platinum.

For example, platinum in the form of $H_2PtCl_4$ can be contacted with oxide particles, thereby adsorbing platinum ions on the surface of the oxide particles in stoichiometric or excess amounts. Preferably, non-adsorbed platinum ions are removed by, for example, rinsing, filtration or dialysis. The platinum-adsorbed oxide particles can then be treated with a reducing agent, such as, for example, $NaBH_4$, citric acid, hypophosphorous acid, or hydrazine, to effect reduction of the adsorbed platinum.

The platinum-adsorbed metal oxide particles can alternatively be electrolytically treated to effect reduction of the adsorbed platinum. For example, the platinum-adsorbed oxide particles can be placed on an electrode and subjected to suitable reducing potentials.

Chemical vapor deposition methods for depositing zerovalent or partially charged platinum onto metal oxide substrate particles involve the diffusion of volatile platinum precursor molecules onto the oxide surface and decomposition of the platinum precursor on the oxide surface to zerovalent or partially charged platinum. For example, cyclopentadienyltrimethylplatinum ($CpPtMe_3$) or (methylcyclopentadienyl)-trimethylplatinum ($MeCpPtMe_3$), where Me is methyl and Cp is cyclopentadienyl, can be used as suitable volatile platinum precursor molecules in a CVD process.

Physical vapor deposition methods for depositing zerovalent or partially charged platinum onto metal oxide particles involve the direct deposition of platinum atoms onto the oxide surface. For example, a platinum source can be evaporated, sputtered, or laser ablated, thereby creating a vapor or plasma of platinum atoms. When contacted with the metal oxide substrate particles, the platinum vapor or plasma condenses onto the oxide surface.

In a preferred embodiment, the metal-metal oxide composite is made by forming a non-noble metal ion adsorbate on a metal oxide core. See FIG. 1. Metal cations, such as $Pb^{2+}$, $Zn^{2+}$, $Cu^{2+}$, $Bi^{3+}$, $Tl^+$, $Cd^{2+}$, $Ag^+$, $Sn^{2+}$, $Hg^+$, $Sb^{3+}$, $Se^{4+}$, and $Te^{4+}$, or their anionic forms in alkaline solution are adsorbed onto a metal oxide core by any suitable method. For example, a solution with a proper pH can be used so that a potential of zero charge can be adjusted to have a negative dipole of OH or O at the oxide surface pointing to the electrolyte. The negative dipole enables the surface to adsorb ions. Then the metal oxide core is immersed in a solution containing the metal ions. The metal oxide core is then emersed from solution and rinsed with water. The adsorbed ions will remain on the surface.

Figure 1:
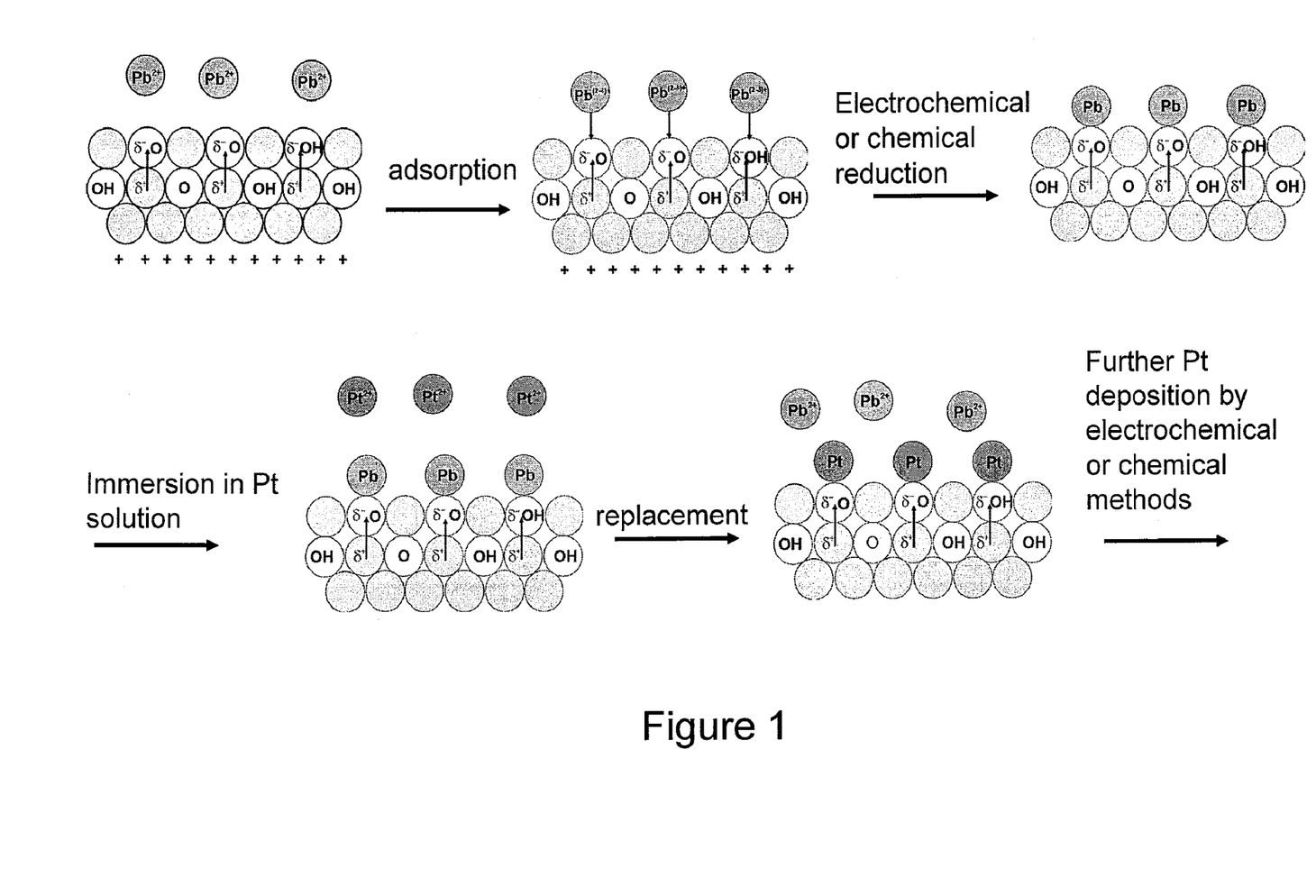
FIG. 1 depicts a method for the synthesis of metal-metal oxide catalysts and electrocatalysts.

After the ions are adsorbed to the surface, the ions are reduced. The ions can be reduced according to the methods described above for the platinum ions.

In the final step, the surface is contacted with a solution containing a salt of one or more noble metals which replace a less noble metal by oxidizing it, while reducing itself. The more noble metal salts are preferably salts of platinum, gold, palladium, silver, ruthenium, rhodium, osmium, iridium, or combinations thereof. Preferably, the noble metal salt is a salt of platinum. The noble metal salts may also be platinum-iridium salts or platinum-gold salts.

The process can be repeated in order to attain a desired level of coating of the metal oxide core.

The metal oxide substrate particles described above, i.e., the metal oxide core, can be synthesized by various means known in the art. Some methods known in the art for synthesizing such oxide particles include solid-state methods, sol gel methods, and electrolytic methods.

Suitable solid-state methods for synthesizing metal oxide substrate particles typically include the application of heat. For example, particles of $NiWO_4$ and $CoWO_4$ can be produced by heating a combination of the corresponding metal nitrate and ammonium tungstate at approximately 600° C. Another example is the preparation of a metal tungsten bronze by heating the metal and tungsten trioxide at approximately 800° C., or by heating a combination of a metal oxide, tungsten, and tungsten trioxide at approximately 1000° C.

Suitable sol gel methods for synthesizing metal oxide substrate particles typically include the hydrolytic reaction between one or more metal alkoxides, metal amides, or metal carboxylates. Hydrolysis of the one or more oxide precursors is generally effected by water and can be further aided by catalytic amounts of an acid or base. Particle size can be adjusted by inclusion of surface active agents, complexants, or by the use of ordered mesoporous molecular sieves or zeolites. Partially hydrolyzed reaction products can also be thermally treated, pressurized, or sintered in the presence of oxygen to promote fall conversion to the oxide particles.

For example, sol gel synthesis can be used to produce titanium oxide particles by hydrolysis of titanium isopropoxide, $Ti[OCH(CH_3)_2]_4$; or vanadium oxide particles by hydrolysis of vanadium (V) triisopropoxide oxide, $VO[OCH(CH_3)_2]_3$. Another example is the synthesis of mixed tantalum-niobium oxide particles by hydrolysis of a mixture of tantalum ethoxide and niobium (V) ethoxide.

An example of a suitable electrolytic method for synthesizing metal oxide substrate particles includes the electrolysis of a fused salt of a tungstate and tungsten trioxide. For example, sodium tungsten bronzes can be prepared by electrolyzing a fused salt of sodium tungstate and tungsten trioxide.

Another example of a suitable electrolytic method for synthesizing metal oxide substrate particles includes subjecting precursor zerovalent or partially charged metal particles to suitable oxidizing potentials. The oxidizing potential used is suitable when it can cause the conversion of such precursor reduced metal particles to the corresponding metal oxide composition.

Preferably, the precursor reduced metal particles are zerovalent metal particles, i.e., are composed of one or more zerovalent metals. The zerovalent metal particles can be held on an electrode for this purpose. For example, ruthenium oxide particles can be produced by subjecting zerovalent ruthenium particles to an oxidizing voltage sufficient for converting ruthenium to ruthenium oxide.

Such precursor metal particles can be obtained commercially or prepared by methods known in the art. A preferred preparative method includes chemical reduction of the corresponding metal salt(s) in a liquid phase. The liquid phase typically includes surface active agents and/or metal complexants to adjust particle sizes.

Thus, whereas there have been described what are presently believed to be the preferred embodiments of the present invention, those skilled in the art will realize that other and further embodiments can be made without departing from the spirit of the invention, and it is intended to include all such further modifications and changes as come within the true scope of the claims set forth herein.

The invention claimed is:

1. A method of making a metal-metal oxide composite comprising:
   a) forming a non-noble metal cation adsorbate on a metal oxide core;
   b) reducing said cation adsorbate to provide an oxidation-labile surface; and
   c) contacting said surface with a solution of noble metal salts to replace the reduced absorbate with the noble metal.

2. A method according to claim 1, wherein the cation adsorbate is reduced electrochemically.

3. A method according to claim 1, wherein the cation adsorbate is reduced chemically.

4. A method according to claim 1, wherein the non-noble metal cation adsorbate is selected from the group consisting of $Pb^{2+}$, $Zn^{2+}$, $Cu^{2+}$, $Bi^{3+}$, $Tl^+$, $Cd^{2+}$, $Ag^+$, $Sn^{2+}$, $Hg^+$, $Sb^{3+}$, $Se^{4+}$, $Te^{4+}$.

5. A method according to claim 1, wherein said metal oxide core is comprised of a stoichiometric or non-stoichiometric metal oxide.

6. A method according to claim 5, wherein the metal oxide core is comprised of an oxide of one or more metals selected from the group consisting of titanium, niobium, yttrium, zirconium, molybdenum, chromium, nickel, manganese, vanadium, tantalum, tungsten, rhenium, ruthenium, rhodium, and iridium.

7. A method according to claim 5, wherein the metal oxide core is comprised of an oxide of tungsten.

8. A method according to claim 7, wherein the oxide of tungsten is a sodium tungsten oxide.

9. A method according to claim 8, wherein the sodium tungsten oxide is a sodium-tungsten bronze.

10. A method according to claim 5, wherein the metal oxide core is comprised of an oxide of niobium.

11. A method according to claim 5, wherein the metal oxide core is comprised of an oxide of titanium.

12. A method according to claim 11, wherein the oxide of titanium is selected from the group consisting of $TiO_2$ and $Ti_4O_7$.

13. A method according to claim 1, wherein the metal oxide core is in the size range of one nanometer to five hundred microns.

14. A method according to claim 13, wherein the metal oxide core is in a size range of approximately ten to fifty nanometers.

15. A method according to claim 1, wherein the noble metal salts are selected from the group consisting of salts of platinum, gold, palladium, silver, ruthenium, rhodium, osmium, iridium, and combinations thereof.

16. A method according to claim 15, wherein the noble metal salts are salts of platinum.

17. A method according to claim 16, wherein said metal oxide core is at least partially encapsulated by an atomically thin layer of zerovalent or partially charged platinum atoms.

18. A method according to claim 17, wherein said atomically thin layer is a submonolayer, monolayer, bilayer, or trilayer, of zerovalent or partially charged platinum atoms.

19. A method according to claim 16, wherein said metal oxide core is bound to zerovalent or partially charged platinum clusters.

20. A method according to claim 19, wherein each of said zerovalent or partially charged platinum clusters independently comprises approximately three to sixty platinum atoms.

21. A method according to claim 15, wherein said metal oxide core is bound to zerovalent or partially charged platinum-noble metal clusters.

22. A method according to claim 21, wherein said platinum metal cluster is selected from the group consisting of platinum-iridium and platinum-gold.

23. A method of making a metal-metal oxide composite wherein the method of claim 1 is repeated to obtain a desired amount of metal coating.

* * * * *